(12) United States Patent
Azghay et al.

(10) Patent No.: US 9,724,678 B2
(45) Date of Patent: Aug. 8, 2017

(54) PROCESS FOR PREPARING A SULPHIDED CATALYST

(71) Applicant: SHELL OIL COMPANY, Houston, TX (US)

(72) Inventors: Ali Azghay, Amsterdam (NL); Marcello Stefano Rigutto, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 173 days.

(21) Appl. No.: 14/786,209

(22) PCT Filed: Apr. 22, 2014

(86) PCT No.: PCT/EP2014/058103
§ 371 (c)(1),
(2) Date: Oct. 22, 2015

(87) PCT Pub. No.: WO2014/173878
PCT Pub. Date: Oct. 30, 2014

(65) Prior Publication Data
US 2016/0067686 A1 Mar. 10, 2016

(30) Foreign Application Priority Data
Apr. 23, 2013 (EP) .................................... 13164937

(51) Int. Cl.
| | | |
|---|---|---|
| *B01J 27/19* | (2006.01) | |
| *B01J 37/20* | (2006.01) | |
| *C10G 45/08* | (2006.01) | |
| *B01J 37/02* | (2006.01) | |

(52) U.S. Cl.
CPC ........... *B01J 27/19* (2013.01); *B01J 37/0213* (2013.01); *B01J 37/0236* (2013.01); *B01J 37/20* (2013.01); *C10G 45/08* (2013.01)

(58) Field of Classification Search
CPC ...... B01J 27/19; B01J 27/188; B01J 37/0213; B01J 37/0236; B01J 37/20; B01J 21/04; C01G 45/08
USPC ............ 502/216, 219–222; 208/46, 108, 143
See application file for complete search history.

(56) References Cited

U.S. PATENT DOCUMENTS

| | | |
|---|---|---|
| 6,280,610 B1 | 8/2001 | Uragami et al. |
| 2010/0133148 A1 | 6/2010 | Timmler et al. |
| 2012/0145600 A1 | 6/2012 | Eijsbouts-Spickova et al. |
| 2012/0168350 A1 | 7/2012 | Mironov et al. |

FOREIGN PATENT DOCUMENTS

| | | | |
|---|---|---|---|
| EP | 0496592 | 7/1992 | |
| EP | 0 601 722 | * 6/1994 | ............. C10G 45/08 |

OTHER PUBLICATIONS

"Acid catalytic properties of reduced tungsten and niobium-tungsten oxides," Chaochao Yue et al. Applied Catalysis B: Environmental 163 (2015), pp. 370-381.*

* cited by examiner

*Primary Examiner* — Patricia L Hailey
(74) *Attorney, Agent, or Firm* — Charles W. Stewart

(57) ABSTRACT

The invention provides a process for preparing a sulphided catalyst comprising the steps of (a) treating a catalyst carrier with one or more Group VIB metal components, one or more Group VIII metal components and a glycolic acid ethoxylate ether compound according to the formula (I) R—$(CH_2)_x$—$CH_2$—O—[—$(CH_2)_2$—O—$]_m$—$CH_2$—COOH (I) wherein R is a hydrocarbyl group containing of from 5 to 20 carbon atoms, x is in the range of from 1 to 15, and m is in the range of from 1 to 10, and wherein the molar ratio of compound (I) to the Group VIB and Group VIII metal content is at least 0.01:1 to 1:0.01; (b) drying the treated catalyst carrier at a temperature of at most 200° C. to form a dried impregnated carrier; and (c) sulphiding the dried impregnated carrier to obtain a sulphided catalyst.

7 Claims, No Drawings

PROCESS FOR PREPARING A SULPHIDED CATALYST

PRIORITY CLAIM

The present application is the National Stage (§371) of International Application No. PCT/EP2014/058103, filed Apr. 22, 2014, which claims priority from European Patent Application 13164937.8, filed Apr. 23, 2013 incorporated herein by reference.

FIELD OF THE INVENTION

The present invention relates to a process for preparing a sulphided catalyst.

BACKGROUND OF THE INVENTION

In refinery processes, feeds such as crude oil, distillates and residual crude oil fractions generally contain contaminants which tend to deactivate catalyst for chemical conversion of the feeds. Contaminants which are especially abundant are sulphur containing compounds, such as hydrogen sulfide and sulphur containing hydrocarbons, and nitrogen containing compounds.

Hydrotreating processes are used to remove such contaminants from refinery feedstocks and generally involve contacting the hydrocarbon feed in the presence of hydrogen with a hydrotreating catalyst under hydrotreating conditions. Besides contaminants removal, further conversions can take place such as hydrocracking and aromatics hydrogenation.

Hydrotreating catalysts comprise hydrogenation metal components on an oxidic carrier. The hydrogenation metal components are generally Group VI metal component such as molybdenum and/or tungsten and Group VIII metal components such as nickel and/or cobalt. The hydrogenation metal components tend to be present as metal sulphide. The metal component can be incorporated into the carrier in the form of the sulphide but generally is converted into sulphide either by sulphiding the catalyst before operation or during start of the operation. Sulphiding the hydrotreating catalyst before it is used in operation is known as a pre-sulphidation treatment. Sulphur-containing compounds for use in pre-sulphidation treatments include mercaptans, sulphides, disulphides, polysulphides and sulphoxides.

The pre-sulphidation treatment results in hydrotreating catalysts that display increased hydrotreating activities. Hydrotreating catalysts that show an improved activity are becoming increasingly important in view of stricter environmental requirements that need to be met.

In addition to the use of a pre-sulphidation treatment organic compounds are being used to improve the activity of hydrotreating catalysts further.

In this respect reference can for instance be made to EP-A-0496592. In this patent specification a method is proposed for preparing a sulphided hydrotreating catalyst in which metals of the Group VI and the Group VIII of the Periodic Table; a carboxylic acid such as glycolic acid, citric acid or gluconic acid; and an organic sulphur compound are mixed with a carrier material, after which the mixture is kneaded, shaped and then dried.

Further, in US-A-2012/0168350, a process is described for preparing a slurry catalyst composition for use in the upgrade of heavy oil feedstock. The process comprises providing an inorganic metal precursor solution comprising at least one of a Group VIB metal precursor and a Group VIII metal precursor; mixing a polar aprotic solvent with the inorganic metal precursor solution to form an oil-dispersible inorganic metal precursor, and providing a sulphiding agent to sulphide the oil-dispersible inorganic metal precursor forming the slurry catalyst. The polar aprotic solvent is a solvent such as N-Methylpyrrolidone (NMP) and dimethylformamide (DMF).

US-A-2012/0145600 describes a process for preparing solutions for use in catalyst preparation which solutions are formed by bringing together in an aqueous medium i) at least one phosphorus compound, ii) at least one Group VI metal compound, iii) at least one Group VIII metal compound and iv) one or more specific ethylene glycols. An organic acid is optionally included.

Object of the present invention is to provide a process for preparing a sulphided catalyst displaying an improved hydrotreating activity.

SUMMARY OF THE INVENTION

It has now been found that this can be established when use is made of a particular class of carboxylic acid ethers.

Accordingly, the present invention provides a process for preparing a sulphided catalyst comprising the steps of:
(a) treating a catalyst carrier with one or more Group VIB metal components, one or more Group VIII metal components and a glycolic acid ethoxylate ether compound according to the formula (I)

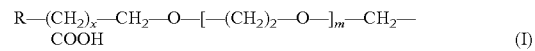

R—(CH$_2$)$_x$—CH$_2$—O—[—(CH$_2$)$_2$—O—]$_m$—CH$_2$—COOH  (I)

wherein R is a hydrocarbyl group containing of from 5 to 20 carbon atoms, x is in the range of from 1 to 10, m is in the range of from 1 to 10, and wherein the molar ratio of compound (I) to the Group VIB and Group VIII metal content is of from 0.01:1 to 1:0.01;
(b) drying the treated catalyst carrier at a temperature of at most 200° C. to form a dried impregnated carrier; and
(c) sulphiding the dried impregnated carrier to obtain a sulphided catalyst.

In accordance with the present invention a process is provided for preparing a sulphided catalyst that is prepared in a more environmentally attractive manner whilst displaying an improved hydrotreating activity when compared to known processes.

DETAILED DESCRIPTION OF THE INVENTION

The catalyst carrier to be treated in step (a) may be any material that can suitably be a carrier for the metal components and which has a porosity that allows the carrier to be filled with the compounds of formula (I). A porous refractory oxide is typically used as a carrier material. Suitable examples of possible suitable porous refractory oxides include silica, alumina, titania, zirconia, silica-alumina, silica-titania, silica-zirconia, titania-alumina, zirconia-alumina, silica-titania and combinations of two or more thereof. The preferred porous refractory oxide for use in the preparation of the composition is one suitably selected from the group consisting of alumina, silica, and silica-alumina. Among these, the most preferred porous refractory oxide is alumina, and more specifically gamma alumina.

The porous refractory oxide generally may have an average pore diameter in the range of from 50-200 Å, measured according to ASTM test D-4222. The total pore volume of the porous refractory oxide is preferably in the range of from 0.2-2 cc/gram.

The surface area of the porous refractory oxide, as measured by the B.E.T. method, generally exceeds 100 m²/gram, and it is typically in the range of from 100-400 m²/gram. The surface area is to be measured by the BET method according to ASTM test D3663-03.

The carrier to be used may be in the form of shaped particles. A shaped carrier may be prepared by any suitable method known to those skilled in the art.

Typically, the porous refractory oxide starting material is in the form of a powder and is mixed with water, and if desired or necessary, other chemical aids such as peptizing agents, flocculating agents, binders or other compounds, to form a mixture or paste that may be formed into an agglomerate or shaped particle. It can be desirable to extrude the mixture to form extrudates of any one or more of various shapes such as cylinders and trilobes having nominal sizes such as 1/16 inch, 1/8 inch and 3/16 inch. The agglomerates or shaped particles that comprise one or more of the previously listed inorganic oxide compounds are then dried and calcined to give the final shaped carrier particles used in accordance with the present invention.

Before use in the present invention, the shaped carrier particles can be dried under standard drying conditions that can include a drying temperature in the range of from 50 to 200° C., preferably, from 75 to 175° C., and more preferably, from 90 to 150° C.

After drying, the shaped carrier particle generally is calcined under standard calcination conditions that include a calcination temperature in the range of from 250 to 900° C., preferably, from 300 to 800° C., and, most preferably, from 350 to 600° C.

The surface area and pore volume of the shaped carrier that has been calcined allows for the impregnation of the shaped carrier with the metal components and compound of formula (I). The calcined shaped carrier can have a surface area that is in the range of from 50-450 m²/g, preferably, from 75-400 m²/g, and, most preferably, from 100-350 m²/g.

The average pore diameter in angstroms (Å) of the calcined shaped carrier preferably is in the range of from 50-200, preferably, from 70-150, and, most preferably, from 75-125.

The pore volume of the calcined shaped carrier preferably exceeds 0.5 cc/g and is typically in the range of from 0.5-1.1 cc/g. More typically, the pore volume is in the range of from 0.6-1.0 cc/g, and, most typically, it is from 0.7-0.9 cc/g. Preferably, less than 10% of the total pore volume of the calcined shaped particle is contained in the pores having a pore diameter greater than 350 Å, more preferably, less than 7.5% of the total pore volume of the calcined shaped particle is contained in the pores having a pore diameter greater than 350 Å, and, most preferably, less than 5%.

The references herein to pore size distribution and pore volume of the calcined shaped particle are to those properties as determined by mercury intrusion porosimetry, ASTM test method D 4284. The measurement of the pore size distribution of the calcined shaped particle is by any suitable measurement instrument using a contact angle of 140° with a mercury surface tension of 474 dyne/cm at 25° C.

The shaped carrier, which preferably has been calcined, can be impregnated in a single step impregnation using a single solution containing one or more Group VIB metal components, one or more Group VIII metal components and a compound of formula (I).

The metal elements of the metal components are those selected from Group VIB, preferably chromium, molybdenum and tungsten, and Group VIII, preferably cobalt and nickel, of the Periodic Table of the Elements as described in the Handbook of Chemistry and Physics $63^{rd}$ Edition. Phosphorous may also be a desired component.

The metal component can be the metal per se or any component containing the metal, including but not limited to metal oxides, metal hydroxides, metal carbonates and metal salts.

For the Group VIII metals, the metal components preferably are chosen from the group consisting of Group VIII metal acetates, formates, citrates, oxides, hydroxides, carbonates, sulfates, and two or more thereof. Preferably, the Group VIII metal components are metal oxides, hydroxides and/or carbonates of nickel and/or cobalt.

For the Group VIB metal components, the preferred components are chosen from the group consisting of Group VIB metal oxides and sulfides.

Preferably, the carrier is first treated with Group VIB metal component(s) and with Group VIII metal component(s) and subsequently with compounds according to formula (I). Most preferably, the carrier is treated with a single solution comprising both the Group VIB metal component(s) and the Group VIII metal component(s), dried and subsequently treated with compounds according to formula (I).

The concentration of the metal compounds in the impregnation solution preferably is selected so as to provide the desired metal content in the final composition of the invention taking into consideration the pore volume of the carrier material into which the aqueous solution is to be impregnated and the amounts of compound of formula (I) that are to be incorporated. This technique also is referred to as pore volume impregnation. Typically, the concentration of metal component in the impregnation solution is in the range of from 0.01-100 to moles per liter.

The ratio of compound of formula (I) to metal, i.e. total amount of Group VIB and Group VIII metals described above, preferably is in the range of from 0.4:1 to 3:1 (weight/weight), more preferably of from 0.5:1 to 2:1. Furthermore, the ratio of compound of formula (I) to metal impregnated carrier, i.e. total amount of Group VIB and Group VIII metals and carrier, preferably is in the range of from 0.05:1 to 1:1 (weight/weight), more preferably of from 0.1:1 to 0.6:1. Most preferred, the weight amount of compound of formula (I) is in the range of the weight amount of active metal.

The impregnation solution comprising the metal component and/or the compound of formula (I) may further include a solvent that suitably provides for the dissolution of the compound of formula (I) and/or the metal compound. Possible solvents include water and alcohols, such as, methanol and ethanol. Water is the preferred solvent for the compound of formula (I).

Any suitable means or method can be used in the impregnation of the shaped carrier with the compound of formula (I) and metal components, provided that such means or method provides for the suitable incorporation or impregnation of the compound of formula (I) and metal component within the pores of the carrier material. Examples of suitable methods of applying the solution to the shaped carrier can include dipping or spraying.

A preferred method for contacting the carrier with the impregnating solution is by any suitable impregnation method known to those skilled in the art, for instance, impregnation by incipient wetness whereby the amount or volume of solution added to the shaped carrier is such that the total volume of the added solution is in an amount that may range upwardly to about the available pore volume of the shaped carrier to be impregnated with the solution.

The metal content of the shaped carrier having a metal component incorporated therein along with the compound of formula (I) may depend upon the application for which the catalyst is to be used, but, generally, for hydroprocessing applications, the Group VIII metal component, more specifically cobalt and/or nickel, preferably, nickel, can be present in the sulphided catalyst in an amount in the range of from 0.5-20 wt %, preferably from 1-15 wt %, and, most preferably, from 2-12 wt %, based on total dry weight of sulphided catalyst.

The Group VIB metal component, more specifically molybdenum and/or tungsten, preferably, molybdenum, can be incorporated into the shaped carrier in an amount in the range of from 5-50 wt %, preferably from 8-40 wt %, and, most preferably, from 12-30 wt %, based on total dry weight of sulphided catalyst.

The above-referenced weight percents for the metal components are based on the dry weight of sulphided catalyst while the metal component is assumed to be present as the element regardless of the actual form, e.g., the oxide form or sulfide form, of the metal component.

The compound according to formula (I) has suitably a number average molecular weight of from 250 to 1500, preferably in the range of from 300 to 1000.

In formula (I), R is a hydrocarbyl group containing of from 5 to 20 carbon atoms. A hydrocarbyl group is a hydrocarbon from which a hydrogen has been removed. R consists of hydrogen and carbon only. R can contain one or more unsaturated bonds including aromatic bonds. Preferably R is a hydrocarbyl group containing of from 6 to 15 carbon atoms, more preferably a hydrocarbyl group containing of from 6 to 12 carbon atoms.

In formula (I), x is in the range of from 1 to 10. For some compounds, R and x are not yet fixed. An example is the case in which the constituent $R-(CH_2)_x-$ is an alkyl chain. In those instances, R and x are defined as the components which are such that the number of carbon atoms in R and $(CH_2)_x$ are the same or as close as possible. In the latter case, R is chosen as the compound which has the larger number of carbon atoms.

In formula (I), x is in the range of from 1 to 15, preferably in the range of from 2 to 12, more preferably in the range of from 3 to 10.

The number m is in the range of from 1 to 10, more preferably in the range of from 1 to 5. Most preferably m is from 1 to 3.

Preferably, the compound according to formula (I) is chosen from the group consisting of glycolic acid ethoxylate oleyl ether, glycolic acid ethoxylate nonylphenyl ether and glycolic acid ethoxylate lauryl ether. More preferably, the compound according to formula (I) is glycolic acid ethoxylate oleyl ether.

In step (b), the treated catalyst carrier is dried at a temperature of at most 200° C. to form a dried impregnated catalyst.

It is important that the drying temperature in step (b) is not too high. In accordance with the invention the drying temperature is at most 200° C. Preferably, the drying temperature at which the impregnated carrier is dried does not exceed 180° C., and, most preferably, the drying temperature does not exceed 175° C. It is understood that this drying step will, in general, be conducted at lower temperatures than the aforementioned temperatures, and, typically, the drying temperature will be conducted at a temperature in the range of from 60-150° C.

The drying of the impregnated carrier is preferably controlled in a manner so as to provide the resulting dried impregnated carrier to have a volatiles content which does not exceed 20 wt % LOI. It is preferred for the LOI of the dried impregnated carrier to be in the range of from 1-20 wt % LOI, and, most preferred, from 3-15 wt % LOI.

LOI, or loss on ignition, is defined as the percentage weight loss of the material after its exposure to air at a temperature of 482° C. for a period of two hours. LOI can be represented by the following formula: (sample weight before exposure less sample weight after exposure) multiplied by 100 and divided by (sample weight before exposure).

In the drying of the impregnated carrier it is desirable to remove as little of the compound (I) as is practical. Preferably, more than 50 weight percent of compound (I) that is incorporated, based on the total weight of compound (I) incorporated into the impregnated carrier, will remain in the resulting dried impregnated carrier. Preferably, the amount of compound (I) remaining on the dried impregnated carrier exceeds 75 weight percent, and, most preferably, more than 90 weight percent of the compound (I) originally added to the dried impregnated carrier remains in the dried impregnated carrier. Thus, less than 50 weight percent of the compound (I) originally added to the dried impregnated carrier should be removed from the impregnated carrier during the drying step. Preferably, less than 25 weight percent and, most preferably, less than 10 weight percent, of the compound (I) incorporated into the dried impregnated carrier is to be removed from the impregnated carrier during drying step (b).

It is preferred that the dried impregnated carrier as obtained in step (b) contains at most 0.5% wt of sodium, based on total dry weight, more specifically at most 0.1% wt, most specifically at most 0.05% wt.

The impregnated carrier of the invention may be treated ex situ or in situ with a sulphur compound. It is one of the beneficial features of the invention that the impregnated carrier can be sulphided in situ which permits the shipping and delivery of a non-sulphurized composition to a reactor in which it can be activated, in situ, by a sulphurization step which sulphurization step optionally is preceded by a hydrogen treatment step. In the activation of the impregnated carrier it preferably undergoes treatment with a sulphur compound which optionally is preceded by a hydrogen treatment.

The optional hydrogen treatment can include exposing the impregnated carrier to a gaseous atmosphere containing hydrogen at a temperature ranging upwardly to 250° C. Preferably, the impregnated carrier is exposed to the hydrogen gas at a hydrogen treatment temperature in the range of from 100-225° C., and, most preferably, the hydrogen treatment temperature is in the range of from 125-200° C.

The partial pressure of the hydrogen of the gaseous atmosphere used in the hydrogen treatment step generally can be in the range of from 1-70 bar, preferably, from 1.5-55 bar, and, most preferably, from 2-35 bar. The impregnated carrier is contacted with the gaseous atmosphere at the aforementioned temperature and pressure conditions for a hydrogen treatment time period in the range of from 0.1-100 hours, and, preferably, the hydrogen treatment time period is from 1-50 hours, and most preferably, from 2-30 hours.

Sulphiding of the impregnated carrier can be done using any conventional method known to those skilled in the art. Thus, the impregnated carrier can be contacted with a sulphur-containing compound, which can be hydrogen sulphide or a compound that is decomposable into hydrogen sulphide, under the contacting conditions of the invention. Examples of such decomposable compounds include mercaptans, $CS_2$, thiophenes, dimethyl sulfide (DMS), and dimethyl disulfide (DMDS). Also, preferably, the sulphiding is accomplished by contacting the composition, under suitable sulphurization treatment conditions, with a hydrocarbon feedstock that contains a concentration of a sulphur-containing compound. The sulphur-containing compound of the hydrocarbon feedstock can be an organic sulphur compound, particularly, one which is typically contained in petroleum distillates that are processed by hydrodesulphurization methods.

Suitable sulphurization treatment conditions are those which provide for the conversion of the active metal components of the impregnated carrier to their sulphided form. Typically, the sulphiding temperature at which the impregnated carrier is contacted with the sulphur-containing compound is in the range of from 150-450° C., preferably, from 175-425° C., and, most preferably, from 200-400° C.

When using a hydrocarbon feedstock that is to be hydrotreated using the catalyst composition of the invention, the sulphurization conditions can be the same as the process conditions under which the hydrotreating is performed. The sulphiding pressure at which the impregnated carrier is sulphided generally can be in the range of from 1-70 bar, preferably, from 1.5-55 bar, and, most preferably, from 2-35 bar.

One of the benefits provided by the invention is that it can be utilized in a reactor system that is started up using a so-called delayed feed introduction procedure. In the delayed feed introduction procedure, the reactor system, which includes a reactor vessel containing the impregnated carrier, first undergoes a heating step to raise the temperature of the reactor and impregnated carrier contained therein in preparation for the introduction of a sulphiding agent or heated hydrocarbon feedstock for processing. This heating step can include introducing into the reactor hydrogen-containing gas at the aforementioned hydrogen treatment conditions. The impregnated carrier can be treated with a sulphur-containing compound in the manner as earlier described herein.

It is recognized that the impregnated carrier of the invention, after its treatment with sulphur, is a highly effective catalyst for use in the hydrotreating of hydrocarbon feedstocks. This catalyst is particularly useful in applications involving the hydrodesulphurization or hydrodenitrogenation of hydrocarbon feedstocks, and, especially, it has been found to be an excellent catalyst for use in the hydrodesulphurization of distillate feedstocks, in particular, diesel, to make an ultra-low sulphur distillate product having a sulphur concentration of less than 15 ppmw, preferably, less than 10 ppmw, and, most preferably, less than 8 ppmw.

In the hydrotreating applications, the impregnated carrier, optionally used in a delayed feed introduction procedure or otherwise treated with sulphur, is contacted under suitable hydrodesulphurization conditions with a hydrocarbon feedstock that typically has a concentration of sulphur. The more typical and preferred hydrocarbon feedstock is a petroleum middle distillate cut having a boiling temperature at atmospheric pressure in the range of from 140-410° C. These temperatures are approximate initial and boiling temperatures of the middle distillate. Examples of refinery streams intended to be included within the meaning of middle distillate include straight run distillate fuels boiling in the referenced boiling range, such as, kerosene, jet fuel, light diesel oil, heating oil, heavy diesel oil, and the cracked distillates, such as FCC cycle oil, coker gas oil, and hydrocracker distillates. The preferred feedstock of the inventive distillate hydrodesulphurization process is a middle distillate boiling in the diesel boiling range of from 140-400° C.

The sulphur concentration of the middle distillate feedstock can be a high concentration, for instance, being in the range upwardly to 2 weight percent of the distillate feedstock based on the weight of elemental sulfur and the total weight of the distillate feedstock inclusive of the sulphur-containing compounds. Typically, however, the distillate feedstock of the inventive process has a sulphur concentration in the range of from 0.01-1.8 wt % (100-18,000 ppmw). But, more typically, the sulphur concentration is in the range of from 0.1-1.6 wt % (1000-16,000 ppmw), and, most typically, from 0.18-1.1 wt. % (1800-11,000 ppmw). It is understood that the references herein to the sulphur content of the distillate feedstock are to those compounds that are normally found in a distillate feedstock or in the hydrodesulphurized distillate product and are chemical compounds that contain a sulfur atom and which generally include organosulphur compounds.

The sulphided catalysts prepared by the present invention are particularly useful in applications involving the catalytic hydroprocessing of petroleum derived feedstocks, such as in the hydrotreating of atmospheric distillates, gas oils and residues and of vacuum gas oils and residues. The compositions have been found to have exceptional hydrodesulfurization activity and to exhibit good catalytic stability when compared to known hydrotreating catalysts.

The present invention therefore also provides a process for hydrotreating a sulphur containing hydrocarbon feedstock which process comprises contacting hydrocarbon feedstock at a hydrogen partial pressure from 1 to 70 bar and a temperature of from 200 to 420° C. with a catalyst prepared according to present invention.

The impregnated carrier of the invention may be employed as a part of any suitable reactor system that provides for contacting it or its derivatives with the distillate feedstock under suitable hydrodesulphurization conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulphur distillate product from the reactor vessel.

The hydrodesulphurization process generally operates at a hydrodesulphurization reaction pressure in the range of from 689.5-13,789 kPa (100-2000 psig), preferably from 1896-10,342 kPa (275-1500 psig), and, more preferably, from 2068.5-8619 kPa (300-1250 psig).

The hydrodesulphurization reaction temperature is generally in the range of from 200-420° C. (392-788° F.), preferably, from 260-400° C. (500-752° F.), and, most preferably, from 320-380° C. (608-716° F.). It is recognized that one of the unexpected features of the use of the composition of the invention is that it has a significantly higher catalytic activity than certain other alternative catalyst compositions, and, thus, it will, in general, provide for comparatively lower required process temperatures for a given amount of hydrotreatment of a feedstock.

The flow rate at which the distillate feedstock is charged to the reaction zone of the inventive process is generally such as to provide a liquid hourly space velocity (LHSV) in the range of from 0.01-10 hr$^{-1}$. The term "liquid hourly space velocity", as used herein, means the numerical ratio of the rate at which the distillate feedstock is charged to the reaction zone of the inventive process in volume per hour divided by the volume of catalyst contained in the reaction zone to which the distillate feedstock is charged. The preferred LHSV is in the range of from 0.05-5 hr$^{-1}$, more preferably, from 0.1-3 hr$^{-1}$. and, most preferably, from 0.2-2 hr$^{-1}$.

It is preferred to charge hydrogen along with the distillate feedstock to the reaction zone of the inventive process. In this instance, the hydrogen is sometimes referred to as hydrogen treat gas. The hydrogen treat gas rate is the amount of hydrogen relative to the amount of distillate feedstock charged to the reaction zone and generally is in the range upwardly to 1781 m$^3$/m$^3$ (10,000 SCF/bbl). It is preferred for the treat gas rate to be in the range of from 89-1781 m$^3$/m$^3$ (500-10,000 SCF/bbl), more preferably, from 178-1602 m$^3$/m$^3$ (1,000-9,000 SCF/bbl), and, most preferably, from 356-1425 m$^3$/m$^3$ (2,000-8,000 SCF/bbl).

The desulphurized distillate product yielded from the process of the invention has a low or reduced sulphur concentration relative to the distillate feedstock. A particularly advantageous aspect of the inventive process is that it is capable of providing a deeply desulphurized diesel product or an ultra-low sulphur diesel product. As already noted herein, the low sulphur distillate product can have a sulphur concentration that is less than 50 ppmw or any of the other noted sulphur concentrations as described elsewhere herein (e.g., less than 15 ppmw, or less than 10 ppmw, or less than 8 ppmw).

The following examples are presented to further illustrate certain aspects of the invention, but these are not to be construed as limiting the scope of the invention.

Example 1—Catalyst A (According to the Invention)

4.64 g 85 wt % phosphoric acid (H$_3$PO$_4$) was diluted with demineralized water to a volume of 16.5 ml and to this was added 10.34 g molybdenum oxide (MoO$_3$) and 2.76 g nickel carbonate (41 wt % Ni). The mixture was then heated under stirring to obtain a clear solution which was then allowed to cool to room temperature. This is hereafter referred to as stock solution.

The stock solution was split into four identical portions. One portion was further diluted with 3.5 ml demineralized water, and the resulting solution was used to impregnate 9.0 g gamma alumina extrudates, pre-dried at 300° C. for 1 h. The impregnated extrudates were dried at a temperature of 100° C. for 4 h. Finally, a portion of 5.0 g of the dried product was impregnated with 1.8 g glycolic acid ethoxylate 4-nonylphenyl ether (number average molecular weight of 600), and not further calcined.

Example 2—Catalyst B (Comparative Catalyst)

To a second portion of the stock solution of Example 1 was added 0.5 ml water, 1.04 ml of citric acid solution (50 wt %) and 2.24 ml of polyethylene glycol having a average molecular weight of 200 (PEG-200) and stirred for 1 hour. The resulting clear solution was used to impregnate 9.0 g gamma alumina extrudates, pre-dried at 300° C. for 1 h. The product was dried at a temperature of 100° C. for 4 h, and not further calcined.

Example 3—Catalyst C (Comparative Catalyst)

This example represents the teaching of US-A-2012/0145600.

A suspension was prepared by adding a small amount of water to 0.69 g nickel carbonate (41 wt % Ni) followed by 0.295 g 85% phosphoric acid and 1.03 g molybdenum oxide. The suspension was heated at 92° C. until it became possible to stir. Then additional 1.55 g molybdenum oxide was added in small portions at 92° C. The mixture was further stirred at this temperature until a clear solution was obtained which was allowed to cool to room temperature. To this solution were successively added 0.7 ml water, 1.04 ml citric acid solution (50 wt. %), 0.49 ml 85% phosphoric acid and finally 2.24 ml polyethylene glycol having a average molecular weight of 200 (PEG-200). The mixture was shaken and placed in a oven at 60° C. for 1 day. The mixture was allowed to cool to room temperature and shaken again. The resulting clear solution was used to impregnate 9.0 g gamma alumina extrudates, pre-dried at 300° C. for 1 h. The product was dried at a temperature of 100° C. for 4 h, and not further calcined.

Example 4—Hydrodesulfurization Performance

Catalysts A-C all have identical metal loadings on a dry weight basis: 2.65% w Ni, 13.5% Mo, 2.45% P.

Testing was carried out in a hydrotreating simulation test using a gasoil feedstock having the properties shown in Table 1.

TABLE 1

| Feedstock Properties | | |
|---|---|---|
| Density 15° C. | g/ml | 0.865 |
| Carbon content | % w | 85.32 |
| Hydrogen content | % w | 12.97 |
| Sulphur content | % w | 1.71 |
| Total nitrogen content | ppmw | 190 |
| Basic nitrogen content | ppmw | 74 |
| Monoaromatics content | % w | 5.5 |
| Diaromatics content | % w | 4.7 |
| Triaromatics and higher content | % w | 2.4 |
| Initial boiling point | ° C. | 173 |
| 10% w boiling point | ° C. | 251 |
| 50% w boiling point | ° C. | 327 |
| 90% w boiling point | ° C. | 390 |
| Final boiling point | ° C. | 431 |

The testing was carried out in once-through microflow equipment loaded with a catalyst bed comprising 0.53 ml of catalyst, crushed and sieved to a 30-80 mesh sieve fraction.

Prior to the testing, the catalyst was preconditioned in hydrogen at 150° C. and then liquid-phase presulfided using a sulfur-spiked gasoil feed and hydrogen at a pressure of 40 bar and with a temperature profile rising from 150° C. to a final temperature of 340° C.

To measure hydrodesulfurization activity, the gas oil feedstock was contacted with the catalyst bed in a once-through operation at a space velocity of 1.15 liter of gasoil per liter of catalyst per hour (1/1/h); a hydrogen gas/heavy gasoil ratio of 350 Nl/kg; and a total pressure of 40 bar (4.0 MPa).

Hydrodesulfurization performance was assessed by measuring residual sulphur content of product obtained at a catalyst bed temperature of 355° C. and after 72 hours on stream. The results shown in Table 2 show that catalyst A according to the invention is significantly more active than comparative catalysts B and C.

TABLE 2

|  | S (ppm) |
|---|---|
| Catalyst A | 19 |
| Catalyst B | 37 |
| Catalyst C | 164 |

The which is claimed is:

1. The process for preparing a sulphided catalyst comprising the steps of
   (a) treating a catalyst carrier with one or more Group VIB metal components, one or more Group VIII metal components and a glycolic acid ethoxylate ether compound according to the formula (I)

R—(CH$_2$)$_x$—CH$_2$—O—[—(CH$_2$)$_2$—O—]$_m$—CH$_2$—COOH    (I)

wherein R is a hydrocarbyl group containing from 5 to 20 carbon atoms, x is in the range of from 1 to 15, and m is in the range of from 1 to 10, and wherein the molar ratio of compound (I) to the Group VIB and Group VIII metal content is at least 0.01:1 to 1:0.01;
   (b) drying the treated catalyst carrier at a temperature of at most 200° C. to form a dried impregnated carrier; and
   (c) sulphiding the dried impregnated carrier to obtain a sulphided catalyst.

2. The process according to claim 1, in which the compound according to formula (I) has a molecular weight of from 250 to 1500.

3. The process according to claim 1, in R is a hydrocarbyl group containing of from 6 to 15 carbon atoms, x is in the range of from 1 to 10 and m is of from 1 to 5.

4. The process according to claim 1, in which the carrier is alumina.

5. The process according to claim 4, in which the carrier is gamma alumina.

6. The process according to claim 1, in which the compound according to formula (I) is chosen from the group consisting of glycolic acid ethoxylate oleyl ether, glycolic acid ethoxylate nonylphenyl ether and glycolic acid ethoxylate lauryl ether.

7. The process for hydrotreating a sulphur-containing hydrocarbon feedstock which process comprises contacting the hydrocarbon feedstock at a hydrogen partial pressure from 1 to 70 bar and a temperature of from 200 to 420° C. with a catalyst prepared according to claim 1.

* * * * *